G. HARGREAVES.

Assignor to Mary Hargreaves & G. Upton.

MATCH SPLINTS.

No. 7,553.

Reissued March 13, 1877.

WITNESSES

Robert Everett

George E. Abbrams

INVENTOR.

George Hargreaves

Munn & Smith & Co.

ATTORNEYS.

UNITED STATES PATENT OFFICE.

GEORGE HARGREAVES, OF DETROIT, MICHIGAN, ASSIGNOR TO MARY HARGREAVES AND GEORGE UPTON.

IMPROVEMENT IN MATCH-SPLINTS.

Specification forming part of Letters Patent No. 175,452, dated March 28, 1876; reissue No. 7,553, dated March 13, 1877; application filed December 30, 1876.

*To all whom it may concern:*

Be it known that I, GEORGE HARGREAVES, of Detroit, in the county of Wayne and State of Michigan, have invented an Improvement in Match-Splints; and I do hereby declare that the following is a full, clear, and exact description of the construction and operation of the same, reference being had to the annexed drawings, making a part of this specification, and to the letters and figures of reference marked thereon.

Figure 1:
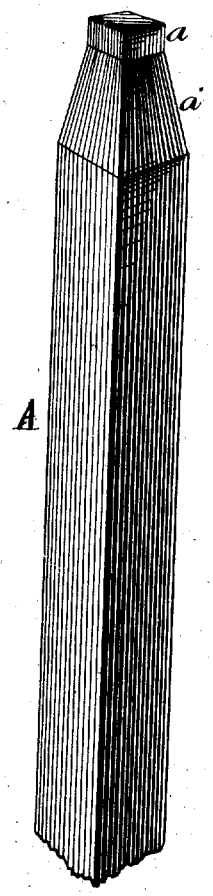
Figure 2:
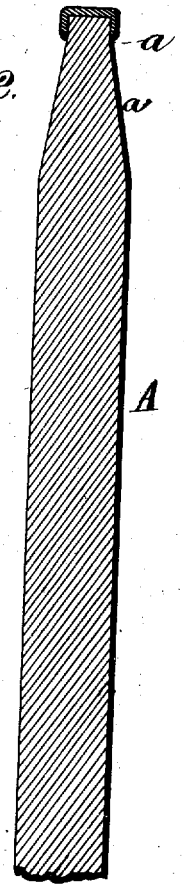

Figure 1 of the drawings is a representation of an enlarged perspective view of my match-splint; and Fig. 2 is a longitudinal vertical sectional view of the same, after dipping.

The object of my invention is to so form the dip ends of match-splints as to avoid the necessity and expense of coiling or reeling the splints preparatory to dipping them, to reduce the amount of dipping compound required to coat the ends, and to lessen their liability to ignite in the packing from friction with one another, as their coated ends are not in contact with each other.

The invention consists in reducing the dip ends or nib of the splints to a lesser area in cross-section than the body thereof, for the purpose more fully hereinafter set forth.

In the annexed drawings, A represents a square match-splint, having its dip end or nib *a* reduced in cross-section by subjecting it to the action of mechanism not necessary here to describe. Between the base of the dip end or nib *a* and the body of the splint the intervening wood is tapered at *a'*.

The splints being bunched, the ends are coated with sulphur, and afterward dipped in the phosphorus mixture, the end or nib *a* alone being immersed in phosphorus mixture, so that when the bunch or bundle is loosened the splints will separate, as they will not have been cemented together by the igniting compound.

In the manufacture of friction-matches, by using splints of this form, the cost of coiling or reeling the splints is avoided, and proves a large saving of labor in well-organized establishments; only a much smaller quantity of the dipping material is required to coat the splints, thereby effecting a large saving over the cost of dipping straight splints, while they will ignite quite as easily and readily as the latter; the coated points, not being in contact with each other, are less likely to ignite by friction with each other in the package than those of the straight splints, which are necessarily in contact with one another at the ends; also, in manufacturing the square-ended splints, their continued contact with one another when the hands are cutting them in two, and otherwise handling them, causes a considerable loss, which will not happen in handling the reduced end splints, because the ends are not in contact with one another.

In manufacturing round splints, I make the end or nib *a* reduced in size, with the wood intervening between the end and the body thereof tapered or conical, so as to have the same advantage over the ordinary square and round splints that my splint first above described has over the plain square splints.

I am aware that efforts have been made by others to secure some of the advantages hereinbefore enumerated by making pointed splints, which have not been successful, for the reason that the limited area of the point would not take up enough of the dipping material to secure ignition, and, being pointed, the dip would not adhere, but would slip off the tapered point.

To overcome this objection, attempts have been made to enlarge the splint-point by "brooming" it, and burring up the extremity, and thereby prevent an enlarged surface for the dipping material to adhere to, but without success, for it will readily be seen that the burring process is too expensive to be practicable, and the weakened point with its dip end would be broken off in attempting to light the match.

What I claim as new, and desire to secure by Letters Patent, is—

1. A match-splint, beveled or tapered near its dip end, and terminating in a nib, *a*, substantially as and for the purpose set forth.

2. A match-splint having a dip end or nib, *a*, and intermediate tapering part, *a'*, substantially as and for the purpose set forth.

In testimony that I claim the above I have hereunto subscribed my name in the presence of two witnesses.

GEORGE HARGREAVES.

Witnesses:

SANFORD C. HOVY,
CHARLES SELDEN.